Figure 9:
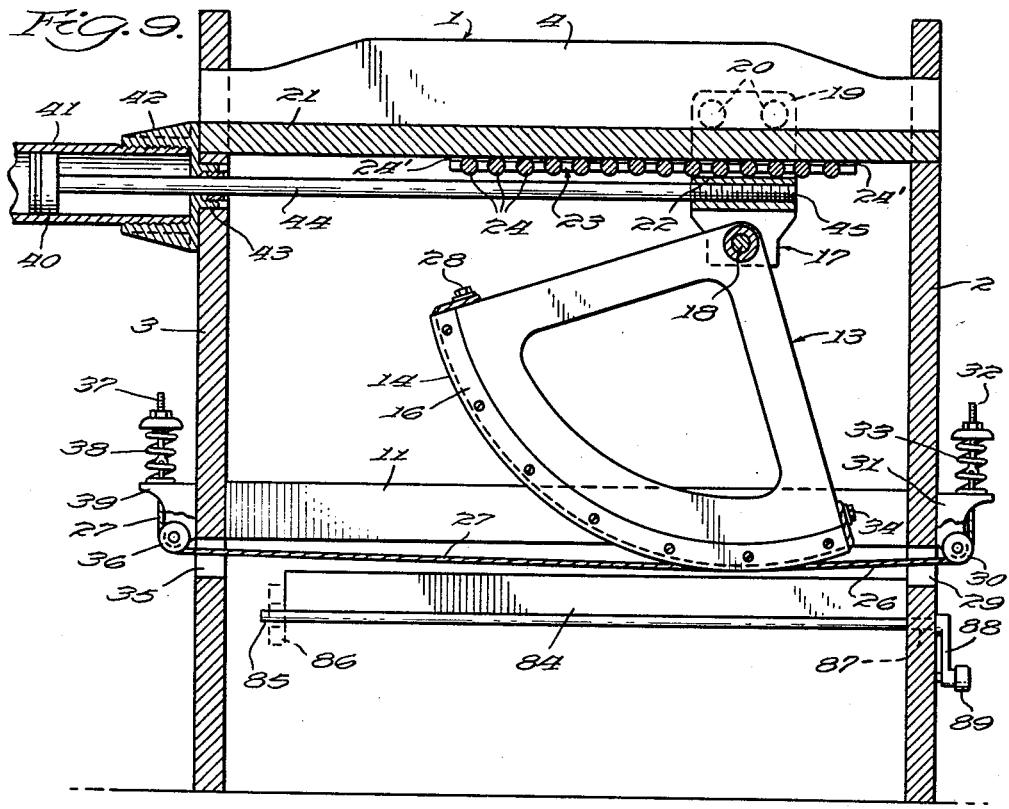

Jan. 26, 1960 A. JENSEN 2,922,458
POWER ACTUATED SHEAR
Filed Nov. 1, 1956 5 Sheets-Sheet 1
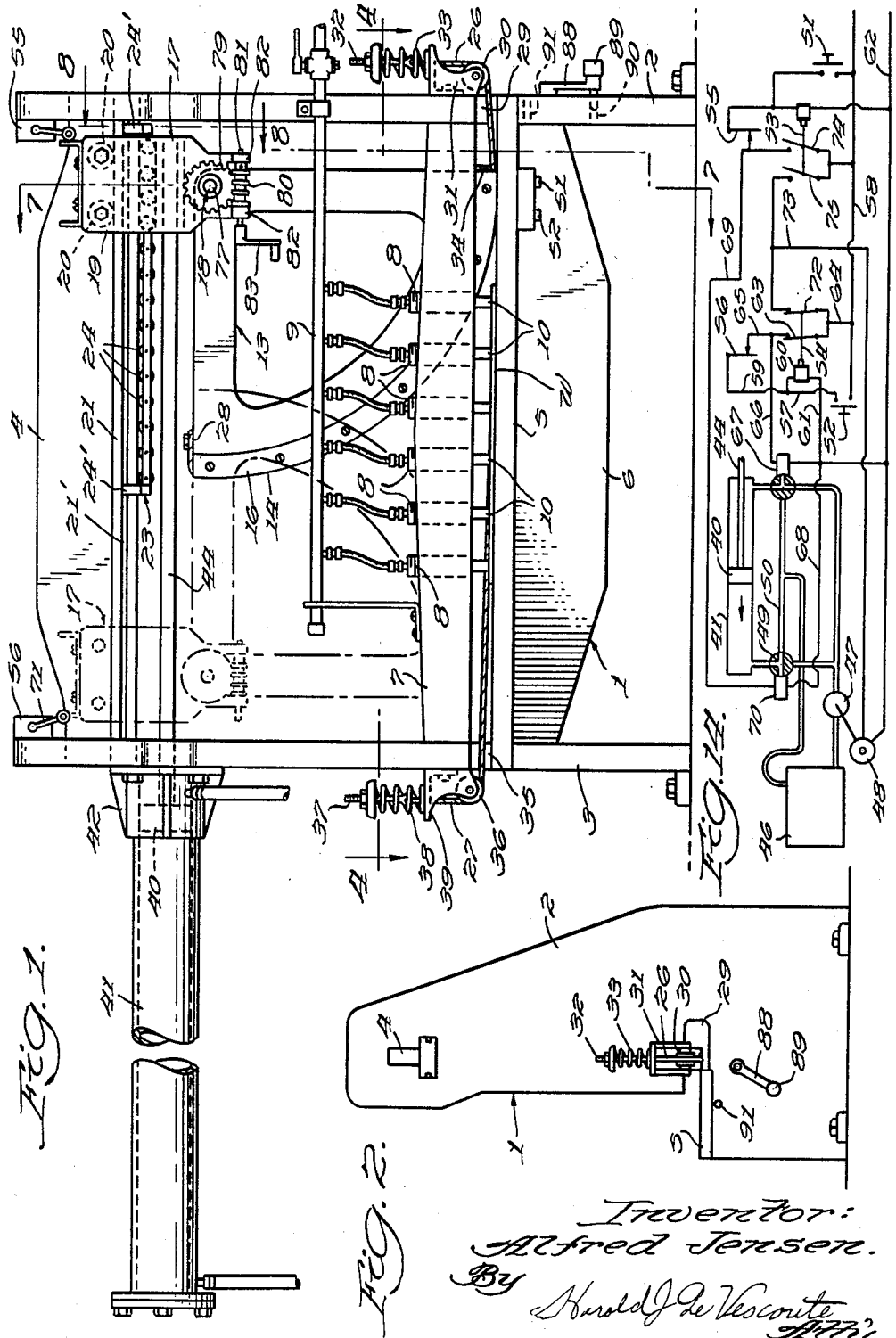
Inventor:
Alfred Jensen.
By Harold J. DeVesconte
Atty.

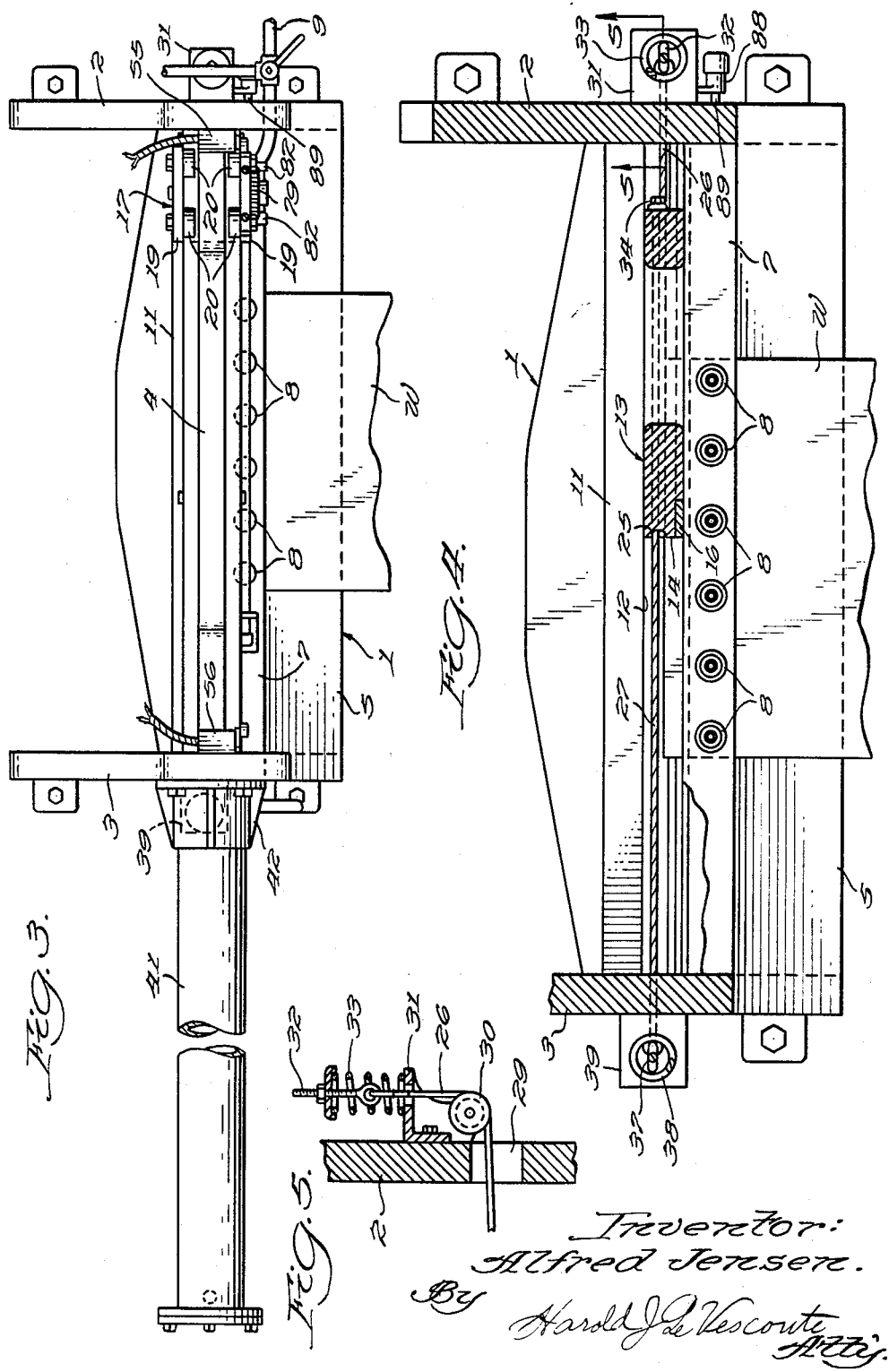

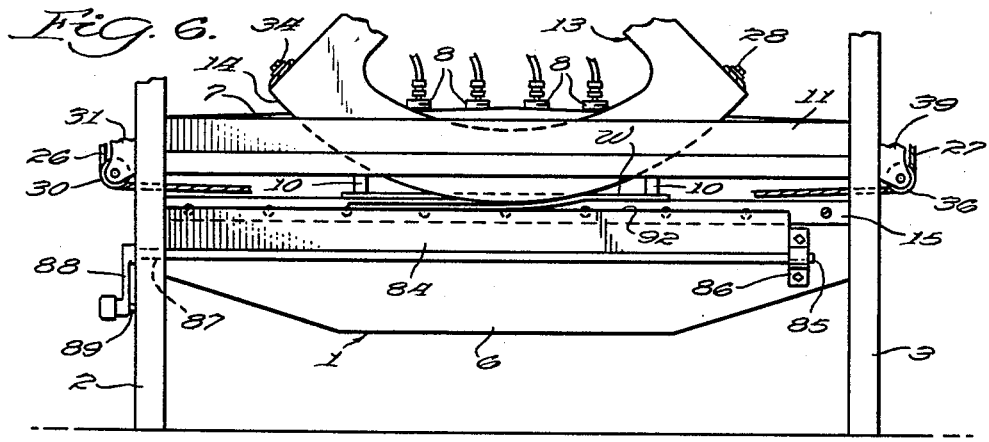
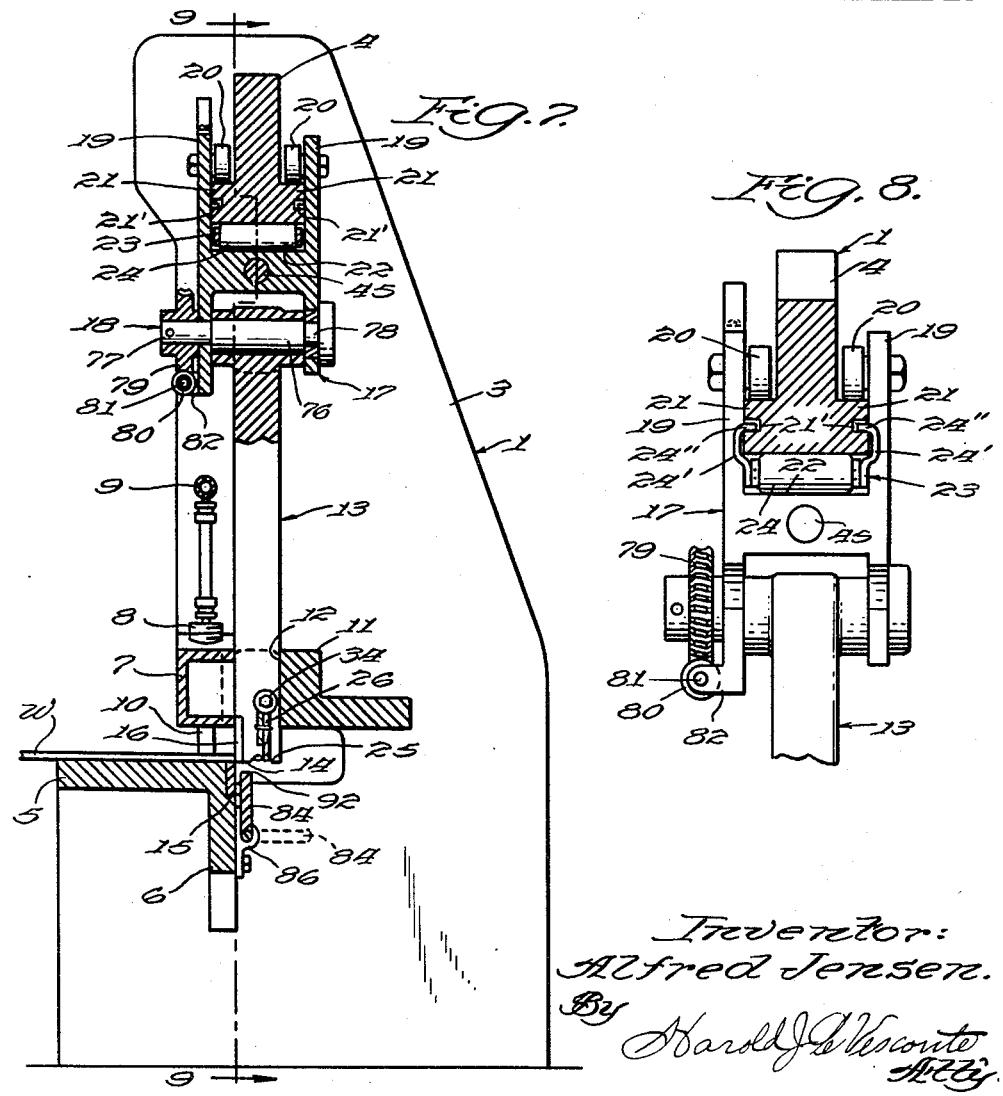

Jan. 26, 1960

A. JENSEN 2,922,458

POWER ACTUATED SHEAR

Filed Nov. 1, 1956

5 Sheets-Sheet 4

Inventor:
Alfred Jensen.
By Harold J. LaVisconte
Atty.

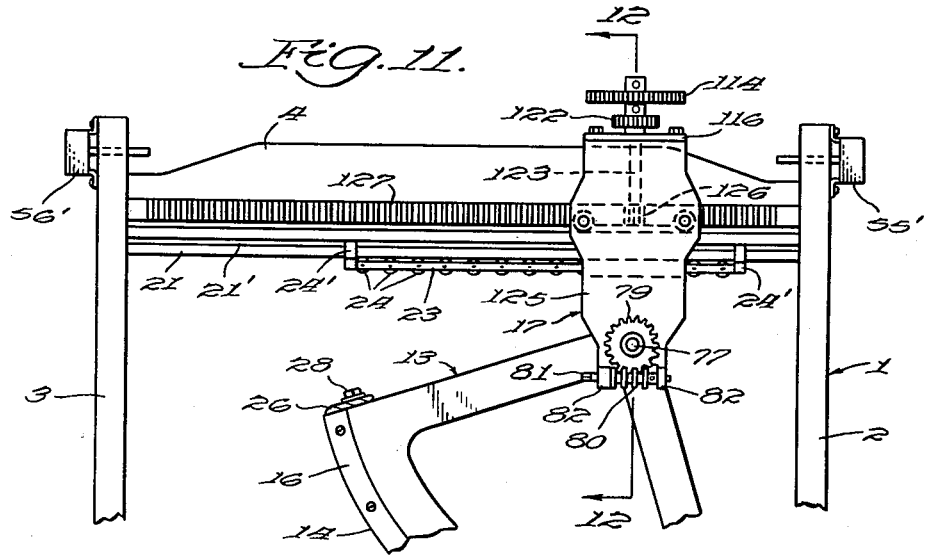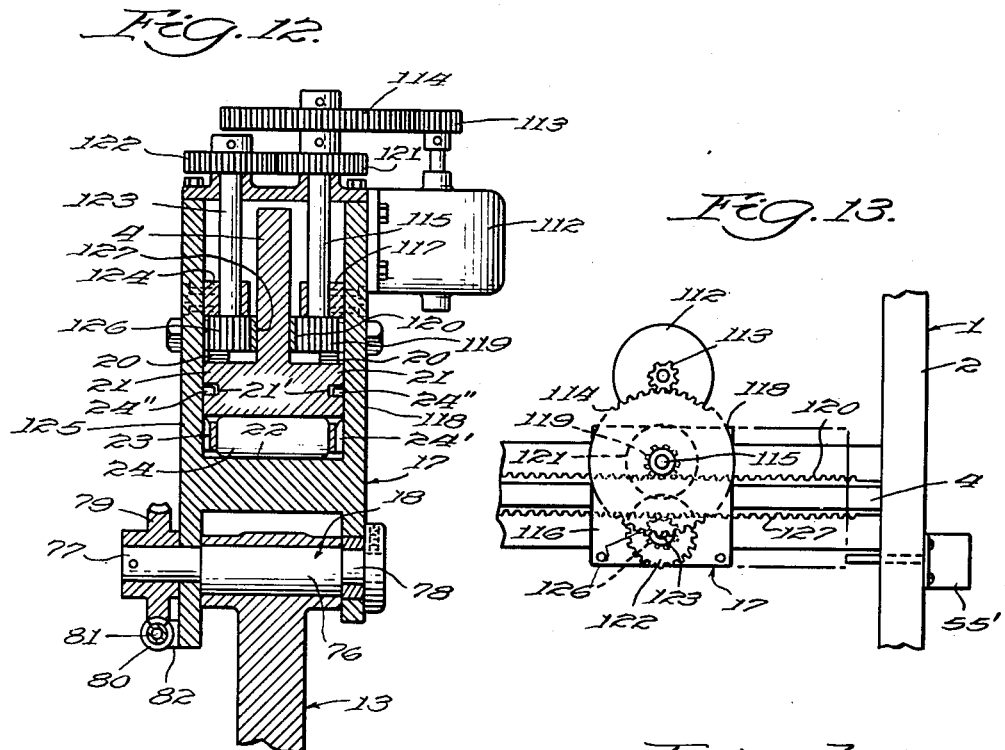

United States Patent Office 2,922,458
Patented Jan. 26, 1960

2,922,458
POWER ACTUATED SHEAR
Alfred Jensen, North Hollywood, Calif.
Application November 1, 1956, Serial No. 619,767
20 Claims. (Cl. 153—2)

This invention relates to sheet metal working machines and more particularly to a shear primarily adapted for heavy sheet metal (commonly known as plate) and like materials.

An object of the device is to provide a shearing apparatus for flat sheet materials characterized by a rolling shear action whereby the extent of movement of the moving cutting element toward or past the stationary cutting element remains constant across the entire width of cut with resultant minimum distortion of the severed material.

Another object of the invention is to provide a shearing apparatus of the above character in which the extent of approach or of overlapping of the cutting edges is readily varied.

A further object of the invention is to provide a shearing apparatus embodying the first stated objective in which the moving shear element can execute a cutting action in movement in either direction along the length of the stationary cutting element whereby each reciprocation of the moving cutting element effects two successive cutting actions.

Still another object of the invention is to provide a shearing apparatus for sheet metal or the like in which the moving cutting element comprises an arcuate cutting member oscillatable about a pivot pin movable transversely of its axis in a plane parallel to the plane of the material being cut and devices translating the movement of said pin into rolling movement of said cutting edge.

A still further object of the invention is to provide a rolling type shear for sheet metal or the like in which the thrust reaction of a cutting stroke is absorbed by roller bearing means.

Still another object of the invention is to provide a hydraulically operated rolling type shearing apparatus for sheet metal or the like.

A still further object of the invention is to provide a rolling type shearing apparatus in which the first stated objective is achieved in which the traverse of the moving shearing element is derived from an endless chain actuated by a reversible motor.

Still another object of the invention is to provide a rolling type shearing apparatus in which the first stated objective is achieved and in which the actuating power includes a motor and means driven thereby mounted and moving with the driving means for the movable cutting element.

Figure 10:
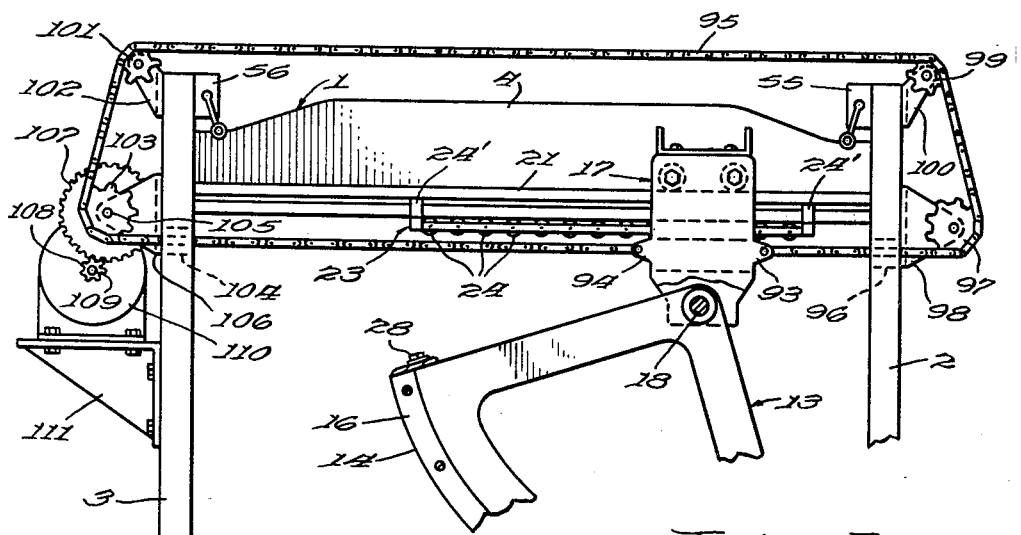

With the foregoing objects in view, together with such additional objects and advantages as may subsequently appear, the invention resides in the parts, and in the construction, combination and arrangement of parts described, by way of example, in the following specification of certain presently preferred embodiments of the invention; reference being had to the accompanying drawings which form a part of said specification and in which drawings:

Fig. 1 is a front elevational view of a hydraulically operated shear embodying the invention,
Fig. 2 is a reduced scale elevational view of the right hand end of Fig. 1,
Fig. 3 is a top plan view of Fig. 1,
Fig. 4 is a sectional plan view taken on the line 4—4 of Fig. 1,
Fig. 5 is a fragmentary sectional view taken on the line 5—5 of Fig. 4,
Fig. 6 is a fragmentary rear elevational view of the embodiment shown in Fig. 1 showing the shearing element in the process of making a cut across a sheet of material,
Fig. 7 is a vertical sectional view taken on the line 7—7 of Fig. 1,
Fig. 8 is an enlarged scale, fragmentary sectional view taken on the line 8—8 of Fig. 1,
Fig. 9 is a front sectional view taken on the staggered line 9—9 of Fig. 7,
Fig. 10 is a fragmentary front elevational view of an embodiment of the invention in which an endless chain driven by a reversible motor is employed to effect the cutting or shearing action,
Fig. 11 is a fragmentary front elevational view showing a rack and gear means for imparting action to the movable cutting component,
Fig. 12 is a vertical sectional view taken on the line 12—12 of Fig. 11,
Fig. 13 is a top plan view of the driving means shown in Figs. 11 and 12, and
Fig. 14 is a schematic drawing showing a control means for the first disclosed form of the invention.

Preferably, the frame 1 of the machine is a unitary structure formed from heavy steel plate sections welded together although it may be formed of plates or castings either bolted or welded together or the frame may be cast as a unit. The frame comprises end members 2 and 3 connected at their upper ends by a top rail member 4 of inverted T-section and adjacent their lower front portions by a generally horizontal table member 5 and a vertically depending rib 6 at the rear face of the section 5. Disposed above and parallel to the table is a cross member 7 carrying hold down devices 8 here shown as hydraulic cylinders connected to a source of pressure 9 and having pistons terminating in depending piston rods 10 which engage and hold workpieces W on the table member 5. Alternatively, the hold down devices may be screw operated and any of the common forms of such devices may be used. Directly in rear of and disposed in parallel spaced relation to the cross member 7 is a rear cross member 11; the adjacent parallel faces of the cross members 7 and 11 forming a guideway 12 for the lower end of the movable shearing member 13.

The shearing member 13 is segmental in configuration as viewed from the front or rear of the machine and by means presently to be described, the curved peripheral edge 14 is caused to roll along the rear upper edge of the table member 5 to effect a shearing action between the stationary blade 15 carried by the rear face of the table member 5 and the curved blade 16 carried by the member 13. The upper portion of the member 13 is connected to the under side of a carriage means 17 by a pivot pin 18 disposed transversely to the line of shearing action; said carriage extending upwardly in members 19, 19 on opposite sides of the top rail 4 and each member 19 carrying rollers 20, 20 riding on the upper faces of the flanges 21, 21 extending laterally from the bottom edge of the top rail 4. A roller bearing means between the top face 22 of the carriage 17 and the under face of the rail 4 is provided and consists of a frame 23 of substantially half the length of the span between the side members 2 and 3; said frame including a plurality of rollers 24 extending transversely of the length of the rail 4. As the carriage 17 is traversed along the rail (especially during a shearing operation) the carriage will be urged upwardly toward the under face of the rail 4. The rollers thus positioned between the adjacent faces of the carriage and rail absorb the thrust and reduce the resistance to movement of the carriage along the rail. Preferably, the carriage is provided with stop members 24' at each end thereof effective to prevent the carriage from running off of the above described roller bearing structure, said stop members terminating in tongue elements 24" engaging grooves 21' in the flanges 21 to support the ends of the frame protruding beyond the cariage 17. The lower edge of the member 13 adjacent to the rear face of the blade 16 is provided with a groove 25 for anchoring cables 26 and 27. As viewed in Fig. 1, one end of the cable 26 is anchored to the edge of the member 13 at 28 and the cable thence extends along the groove 25, thence through the throat opening 29 in the frame member 2, thence upwardly over a sheave 30 carried by a bracket 31 on the outer face of the side member 2 and terminates in an eyebolt 32 supported by a compression spring 33 also mounted on the bracket 31 on the side member 2. The cable 27 correspondingly is secured at 34 to the opposite edge of the member 13 and thence extends similarly but oppositely along the groove 25, thence through the throat opening 35 in the side member 3 and thence over a sheave 36 and terminates in an eyebolt 37 supported by a compression spring 38 carried by a bracket 39 on the side member 3 which also supports the sheave 36. Both springs 33 and 38 are placed under compression and the resulting initial tension on the cables enables the member 13 to roll along the cables, rolling up one and unrolling the other as the carriage is caused to traverse the top rail without undue stress on the frame structure.

The traversing or driving means for the carriage shown in Figs. 1, 3, 7, 8, and 14 comprises a piston 40 reciprocable in a horizontal cylinder 41 fixed to the outer face of the side member 3 with the axis of the cylinder disposed in a line slightly below the top rail 4 and in the medial longitudinal vertical plane of the top rail. The outer end of the cylinder is closed and the end adjacent the side member 3 is externally threaded for engagement with a bracket member 42 secured to the face of the side member 3; said bracket member including a sleeve portion 43 disposed in an opening in the side member which serves as a guide and stuffing box for a piston rod 44 having one end thereof attached to the piston and the other end 45 threadedly engaging the carriage 17 (see Fig. 9). Pressure fluid is supplied to one end or the other of the cylinder and simultaneously expelled from the opposite end of the cylinder to effect reciprocation of the piston and resultant traverse of the carriage and rocking movement of the moving shear element. A representative control means is diagrammatically shown in Fig. 14 comprising a reservoir 46 to which the intake of a pump 47 driven by a motor 48 is connected. The discharge line of the pump is connected to the inlet sides of two electrically operated three way valves 49 and 49' whose common ports are connected to the opposite ends of the cylinder and whose outlet ports are connected by a line 50 to the reservoir 46. The electrical controls for the hydraulic system comprise two push buttons 51 and 52 connected to operate normally open relays 53 and 54, respectively, and two normally closed limit switches 55 and 56 disposed adjacent the members 2 and 3, respectively, in the path of movement of the carriage 17. The push button 52 is interposed in a lead 57 between the power supply line 58 and a lead 59 extending from the operating coil 60 of the relay 54 and one side of the limit switch 56. A lead 61 extends from the opposite side of the coil 60 to the other power supply line 62. Thus upon momentary contact by the pushbutton 52, the relay coil 60 has been energized closing the double pole single throw switch means operated thereby. Upon closure of this switch means, the contact member 63 thereof completes the circuit through the coil 60 through the lead 64 from the line 58, the contact member 63, the lead 65 to the limit switch 56, and the leads 59 and 61 to the line 62 thus holding the relay closed. At the same time a lead 66 connected to the lead 65 energizes the coil 67 of the valve 49' moving that valve to connect the pump discharge with the cylinder. Simultaneously through leads 68 and 69, the coil 70 of the valve 49 is energized to move the valve to connect the other end of the cylinder with the discharge line 50. This series of actions causes the piston to travel from right to left as viewed in Fig. 14 until the carriage engages the operating lever 71 of the limit switch 56, opening that switch and stopping the operation. The contact member 72 of the relay 54 is closed simultaneously with the member 63 and through the lead 73 supplies operating current to the motor 48. Upon stoppage, the normally open relay 54 moves to open position and since the limit switch 56 is also in open position, repeated pushing on the button 52 will only momentarily close the relay with momentary operation of the motor.

Pressing on the button 51 will then reverse the above described actions with closure of the relay 53 and reversal of the positions of the valves so that the direction of travel of the piston 40 is reversed. It is to be noted that the first portion of the travel of the piston and of the carriage 17 moved thereby allows the limit switch which was opened by the previous traverse to close. In this reversed operation, the switch members 74 and 75 of the relay 53 serve the same functions as the members 63 and 72 of the relay 54, respectively.

Thus as the piston 40 is caused to move in either direction, the moving shear member 13 carried by the pivotal mounting on the carriage is caused to roll along the edge of the table member 5 and shear off a sheet of material placed thereon. Each traverse may be employed as a cutting operation so that each complete reciprocation effects two cutting operations.

Since the actual cutting operation is a straight line, other advantages are derived from the novel construction. First, is the fact that for the heavier materials the actual shearing is completed when the moving shear blade has moved through the material about half the thickness of the material. Under such conditions it is not necessary that the shearing blades pass each other. To this end, the moving shear is vertically adjustable with respect to the table 5 and stationary shear blade 15. This adjustment is achieved by making the center portion 76 of the pivot pin 18 eccentric with respect to the axial line of the end bearing portions 77 and 78. The front end 77 of the pin 18 carries a worm wheel 79 which is engaged by a worm 80 mounted on a shaft 81 journaled in brackets 82, 82 on the front face of the carriage 17, one end of said shaft extending beyond the bracket and carrying a detachable hand crank 83 by which it may be rotated with resultant vertical adjustment of the shearing member 13 between a position in which the blades 15 and 16 slightly overlap and another position in which they are separated by a vertical distance equal to at least half the thickness of the thickest material the machine is designed to shear. This limited extent of shearing movement has another most important advantage in that the portion sheared off the work piece remains substantially straight. In the lighter materials the distortion resulting from shearing is negligible, but for heavier materials in which the shearing blades do not meet, means is provided for counteracting and curling tendencies in the severed material. This means comprises a bar 84 having an end 85 mounted in a bearing member 86 carried by the rail 6 adjacent the side member 3 and having a second bearing member 87 journaled in and extending through the side member 2 and carrying an operating crank arm 88 having a locking pin 89 engageable in holes 90 and 91 in the outer face of the side member 2. When the crank arm pin 89 is engaged in the hole 90, the bar is positioned with the edge 92 thereof parallel to and slightly below the edge of the stationary blade 15 so that as the material is sheared off the work piece, it encounters the ledge thus formed by this edge and is prevented from bending out of the general flat plane. When lighter material which is not subject to distortion is being sheared or when, as in trimming operations, warping of the sheared off pieces is to be disregarded, the bar is swung to inoperative position with the locking pin engaged in the hole 91.

Referring next to the form of drive means shown in Fig. 10, the carriage 17 at a point below the level of the roller bearing frame 23 is provided with laterally extending ear portions 93 and 94 which are connected to the opposite ends of a chain 95 which from the ear portion 93 extends through an opening 96 in the side member 2, thence upwardly over an idler sprocket 97 carried by a bracket 98 carried by the side member 2 to a second idler sprocket 99 carried by a bracket 100 and disposed both outwardly and above the side member 2, thence above and parallel to the top rail 4 to an idler sprocket 101 carried by a bracket 102 mounted on the side member 3 and disposed both outwardly of and above the side member 3, thence over a driving sprocket 103, and thence through an opening 104 in the side member 3 to the ear portion 94. The driving sprocket 103 is carried by a shaft 105 journaled in a bracket 106 mounted on the side member 3 and this shaft carries a gear 107 meshing with a pinion 108 on the shaft 109 of a reversible motor 110 mounted on a bracket 111 fixed to the side of the side member 3. As the motor is driven in one direction or the other, the chain will pull the carriage along the top rail in the desired direction. The control means can be like that shown in Fig. 14 with the elimination of the hydraulic system and interposing the motor 110 in the portion of the circuitry comprising the leads 66, 68 and 69 as, for instance, in place of the coil 70 with the coil 67 omitted and the leads 66 and 68 connected at that point; the travel of the carriage 17 being limited by the limit switches 55 and 56 in the same manner as previously described. In place of the push button control illustrated, any other circuitry may be employed that will achieve the reversal of the motor 110 and prevent damage by stopping the motor automatically at the end of the traverse in either direction. Also, while the chain drive above described has been shown applied to the front of the machine, it will be appreciated that a similar chain can be provided at the rear paralleling the chain 95, or that the chain 95 may be disposed in the vertical center line of the carriage.

Referring next to Figs. 11, 12 and 13, a third proposed form for driving the carriage 17 along the top rail is illustrated. In this modification, a vertical axis, reversible motor 112 is mounted on the side of the carriage with the shaft thereof carrying a pinion 113 which meshes with a gear 114 carried by a shaft 115 having the upper end thereof journaled in a plate 116 fixed to and extending across the top of the carriage and the lower end journaled in a bearing block 117 carried by the inner wall of the back member 118 of the carriage. Below the bearing block 117, the shaft 115 carries a pinion 119 which meshes with a rack 120 fixed to the side of the top rail 4 adjacent to one of the side flange portions 21 thereof. Between the bearing in the plate 116 and the gear 114 the shaft 115 carries a gear 121 which meshes with an identical gear 122 carried on the upper end of a shaft 123 having a bearing in the plate 116 at its upper end and journaled in a bearing block 124 carried by the inner face of the front member 125 of the carriage and below the bearing block, the shaft 123 carries a pinion 126 which meshes with a rack 127 on the rear face of the top rail 4 adjacent the flange 21. The operating control may be of any desired character effective to operate the motor 112 selectively in reverse directions; the mode suggested in connection with the form of the invention shown in Fig. 10 being an example. The limit switches here shown at 55' and 56' are of the push rod operated type having operating plunger members extending through openings in the side members 2 and 3, respectively and positioned to be engaged by the upper edges of the front member 125 of the carriage 17 to stop traverse of the carriage and motor. It will be appreciated that either type of limit switch means may be used with any of the modes of execution of the invention disclosed.

The invention provides a shear having high efficiency both in power requirements and in the novel design whereby each traverse of the shearing blade is a cutting action. In addition thereto, the portion of the material sheared off is subjected to minor distortion only. Further, the extent to which the edges of the shearing blades approach or pass each other can be adjusted and for all but the thinnest of materials, the blades do not come in contact with each other and this, in turn, contributes to the life of the blades since the number of times they need to be sharpened is greatly reduced.

While the foregoing specification has disclosed certain presently preferred modes of execution of the invention, it is not to be inferred therefrom that the invention is limited to the exact forms so disclosed by way of example. For instance, while the disclosed embodiments all relate to shearing machines having a horizontal work supporting table, it will be appreciated that for very heavy sheets which must be handled by a crane, the machine may be arranged with the work supporting table in a vertical position with one of the side members serving as the base thus permitting the work piece to be handled by an edge thereof with greater efficiency and safety than when handled in a flat position.

Accordingly, the invention will be understood to include all such changes and modifications in the parts and in the construction, combination and arrangement of parts as shall come within the purview of the appended claims.

I claim:

1. A machine for shearing rigid sheet materials such as sheet metal and the like comprising a frame structure having a horizontal work supporting surface and carrying a stationary cutting blade at the rear face thereof with the edge of said blade disposed substantially in the plane of said surface; said frame structure including a rail disposed above and extending generally parallel to said stationary cutting blade, a carriage movable along said rail, a pivot carried by said carriage and disposed at right angles to the length of said cutting blade, a movable cutting blade supporting member mounted for oscillation on said pivot and having a curved lower surface generated about the axis of said pivot at a radius substantially corresponding to the distance from said axis to said work supporting surface, a movable cutting blade carried by said member disposed with the cutting edge thereof in a vertical plane containing the cutting edge of said stationary blade and curved substantially to the radius of said lower surface of said member, initially tensioned means extending between said movable blade supporting member and said frame structure effective upon movement of said carriage along said rail to impart movement of said member about said pivot with resultant approximation of a rolling action of said movable blade along said stationary blade and the shearing of a sheet of material on said work supporting surface and extending between said blades, and reversible power means operable to cause said carriage to traverse said rail in either direction.

2. A machine for shearing rigid sheet materials such as sheet metal and the like comprising a frame structure having a horizontal work supporting surface and carrying a stationary cutting blade at the rear face thereof with the edge of said blade disposed substantially in the plane of said surface; said frame structure including a rail disposed above and extending generally parallel to said stationary cutting blade, a carriage movable along said rail, a pivot carried by said carriage and disposed at right angles to the length of said cutting blade, a movable cutting blade supporting member mounted for oscillation on said pivot and having a curved lower surface generated about the axis of said pivot at a radius substantially corresponding to the distance from said axis to said work supporting surface, a movable cutting blade carried by said member disposed with the cutting edge thereof in a vertical plane containing the cutting edge of said stationary blade and curved substantially to the radius of said lower surface of said member, means for adjusting the vertical position of said movable blade relative to said stationary blade, initially tensioned means extending between said movable blade supporting member and said frame structure effective upon movement of said carriage along said rail to impart movement of said member about said pivot with resultant approximation of a rolling action of said movable blade along said stationary blade and the shearing of a sheet of material on said work supporting surface and extending between said blades, and reversible power means operable to cause said carriage to traverse said rail in either direction.

3. A machine for shearing rigid sheet materials such as sheet metal and the like comprising a frame structure having a horizontal work supporting surface and carrying a stationary cutting blade at the rear face thereof with the edge of said blade disposed substantially in the plane of said surface; said frame structure including a rail disposed above and extending generally parallel to said stationary cutting blade, a carriage movable along said rail, a pivot carried by said carriage and disposed at right angles to the length of said cutting blade, a movable cutting blade supporting member mounted for oscillation on said pivot and having a curved lower surface generated about the axis of said pivot at a radius substantially corresponding to the distance from said axis to said work supporting surface, a movable cutting blade carried by said member disposed with the cutting edge thereof in a vertical plane containing the cutting edge of said stationary blade and curved substantially to the radius of said lower surface of said member, means for adjusting the position of said pivot with resultant positioning of the cutting edge of said movable blade vertically closer to or further from the cutting edge of said stationary blade, initially tensioned means extending between said movable blade supporting member and said frame structure effective upon movement of said carriage along said rail to impart movement of said member about said pivot with resultant approximation of a rolling action of said movable blade along said stationary blade and the shearing of a sheet of material on said work supporting surface and extending between said blades, and reversible power means operable to cause said carriage to traverse said rail in either direction.

4. A machine for shearing rigid sheet materials such as sheet metal and the like comprising a frame structure having a horizontal work supporting surface and carrying a stationary cutting blade at the rear face thereof with the edge of said blade disposed substantially in the plane of said surface; said frame structure including a rail disposed above and extending generally parallel to said stationary cutting blade and having a bearing face on the lower side thereof, a carriage movable along said rail and having an upper bearing face disposed below and parallel to said bearing face on said rail, a pivot carried by said carriage and disposed at right angles to the length of said cutting blade, roller bearing means interposed between the under face of said rail and said carriage, a movable cutting blade supporting member mounted for oscillation on said pivot and having a curved lower surface generated about the axis of said pivot at a radius substantially corresponding to the distance from said axis to said work supporting surface, a movable cutting blade carried by said member disposed with the cutting edge thereof in a vertical plane containing the cutting edge of said stationary blade and curved substantially to the radius of said lower surface of said member; means, extending between said movable blade supporting member and said frame structure effective upon movement of said carriage along said rail to impart movement of said member about said pivot with resultant approximation of a rolling action of said movable blade along said stationary blade and the shearing of a sheet of material on said work supporting surface and extending between said blades, and reversible power means operable to cause said carriage to traverse said rail in either direction.

5. A machine for shearing rigid sheet materials such as sheet metal and the like comprising a frame structure having a horizontal work supporting surface and carrying a stationary cutting blade at the rear face thereof with the edge of said blade disposed substantially in the plane of said surface; said frame structure including a rail disposed above and extending generally parallel to said stationary cutting blade, a carriage movable along said rail, a pivot carried by said carriage and disposed at right angles to the length of said cutting blade, a movable cutting blade supporting member mounted for oscillation on said pivot and having a curved lower surface generated about the axis of said pivot at a radius substantially corresponding to the distance from said axis to said work supporting surface, a movable cutting blade carried by said member disposed with the cutting edge thereof in a vertical plane containing the cutting edge of said stationary blade and curved substantially to the radius of said lower surface of said member; a pair of oppositely disposed, tensioned, flexible members each having one end thereof attached to said frame structure and thence extending in lines parallel to said rail to a point of tangency with said curved lower face of said movable member and thence along said face to a point of attachment of the other end to said movable cutting blade member at the side thereof opposite the point of attachment to said frame structure; said flexible members in response to movement of said carriage along said rail being respectively wound onto and unwound from said curved lower face with resultant impartation of a rolling action to said movable blade supporting member and consequent shearing of a sheet of material interposed between said blades, and reversible power means operable to move said carriage in either direction along said rail.

6. A machine for shearing rigid sheet materials such as sheet metal and the like comprising a frame structure having a horizontal work supporting surface and carrying a stationary cutting blade at the rear face thereof with the edge of said blade disposed substantially in the plane of said surface; said frame structure including a rail disposed above and extending generally parallel to said stationary cutting blade, a carriage movable along said rail, a pivot carried by said carriage and disposed at right angles to the length of said cutting blade, a movable cutting blade supporting member mounted for oscillation on said pivot and having a curved lower surface generated about the axis of said pivot at a radius substantially corresponding to the distance from said axis to said work supporting surface, a movable cutting blade carried by said member disposed with the cutting edge thereof in a vertical plane containing the cutting edge of said stationary blade and curved substantially to the radius of said lower surface of said member; connecting devices extending between said movable blade supporting member and said frame structure effective upon movement of said carriage along said rail to impart movement of said member about said pivot with resultant approximation of a rolling action of said movable blade along said stationary blade and the shearing of a sheet of material on said work supporting surface a work engaging ledge means disposed at the side of the cutting edge of said stationary cutting blade opposite said movable cutting blade and extending substantially parallel thereto positioned to intercept the cut off edge of a piece of material as it is cut and to re-bend it to a straight condition, and extending between said blades devices including resilient means effective to absorb the shock of initial contact of said movable blade with a workpiece, and reversible power means connected to said carriage, and means for selectively controlling said power means with resultant movement of said carriage in a desired direction by said power means along said rail.

7. A machine for shearing rigid sheet materials such as sheet metal and the like comprising a frame structure having a horizontal work supporting surface and carrying a stationary cutting blade at the rear face thereof with the edge of said blade disposed substantially in the plane of said surface; said frame structure including a rail disposed above and extending generally parallel to said stationary cutting blade, a carriage movable along said rail, a pivot carried by said carriage and disposed at right angles to the length of said cutting blade, a movable cutting blade supporting member mounted for oscillation on said pivot and having a curved lower surface generated about the axis of said pivot at a radius substantially corresponding to the distance from said axis to said work supporting surface, a movable cutting blade carried by said member disposed with the cutting edge thereof in a vertical plane containing the cutting edge of said stationary blade and curved substantially to the radius of said lower surface of said member; connecting devices extending between said movable blade supporting member and said frame structure effective upon movement of said carriage along said rail to impart movement of said member about said pivot with resultant approximation of a rolling action of said movable blade along said stationary blade and the shearing of a sheet of material on said work supporting surface and extending between said blades devices including resilient means effective to absorb the shock of initial contact of said movable blade with a workpiece, and reversible power means comprising a reversible motor having a rotary driving member, and devices actuated thereby reacting between said frame structure and said carriage effective to cause said carriage to traverse said rail in a desired direction.

8. A machine for shearing rigid sheet materials such as sheet metal and the like comprising a frame structure having a horizontal work supporting surface and carrying a stationary cutting blade at the rear face thereof with the edge of said blade disposed substantially in the plane of said surface; said frame structure including a rail disposed above and extending generally parallel to said stationary cutting blade, a carriage movable along said rail, a pivot carried by said carriage and disposed at right angles to the length of said cutting blade, a movable cutting blade supporting member mounted for oscillation on said pivot and having a curved lower surface generated about the axis of said pivot at a radius substantially corresponding to the distance from said axis to said work supporting surface, a movable cutting blade carried by said member disposed with the cutting edge thereof in a vertical plane containing the cutting edge of said stationary blade and curved substantially to the radius of said lower surface of said member; connecting devices extending between said movable blade supporting member and said frame structure effective upon movement of said carriage along said rail to impart movement of said member about said pivot with resultant approximation of a rolling action of said movable blade along said stationary blade and the shearing of a sheet of material on said work supporting surface and extending between said blades devices including resilient means effective to absorb the shock of initial contact of said movable blade with a workpiece, and reversible power means comprising a reversible motor and motor actuated devices carried by said frame and connected to said carriage effective upon actuation of said motor in either direction to move said carriage along said rail in a corresponding direction.

9. A machine for shearing rigid sheet materials such as sheet metal and the like comprising a frame structure having a horizontal work supporting surface and carrying a stationary cutting blade at the rear face thereof with the edge of said blade disposed substantially in the plane of said surface; said frame structure including a rail disposed above and extending generally parallel to said stationary cutting blade, a carriage movable along said rail, a pivot carried by said carriage and disposed at right angles to the length of said cutting blade, a movable cutting blade supporting member mounted for oscillation on said pivot and having a curved lower surface generated about the axis of said pivot at a radius substantially corresponding to the distance from said axis to said work supporting surface, a movable cutting blade carried by said member disposed with the cutting edge thereof in a vertical plane containing the cutting edge of said stationary blade and curved substantially to the radius of said lower surface of said member; connecting devices extending between said movable blade supporting member and said frame structure effective upon movement of said carriage along said rail to impart movement of said member about said pivot with resultant approximation of a rolling action of said movable blade along said stationary blade and the shearing of a sheet of material on said work supporting surface and extending between said blades devices including resilient means effective to absorb the shock of initial contact of said movable blade with a workpiece, and reversible power means comprising a reversible motor mounted on said carriage and devices carried by said carriage and actuated by said motor cooperatively engaging other means attached to said frame structure effective upon actuation of said motor in either direction to move said carriage along said rail in a corresponding direction.

10. A machine for shearing rigid sheet materials such as sheet metal or the like comprising a frame structure having a flat work supporting surface and having a straight, stationary cutting blade with the cutting edge thereof disposed substantially in the plane of said work supporting surface; said frame structure further including a rail spaced from and extending longitudinally parallel to said stationary cutting blade, a carriage mounted on and movable along said rail, a movable cutting blade supporting member mounted on said carriage for oscillatory movement about an axis disposed at right angles to the path of travel of said carriage along said rail and said member further having a curved face disposed adjacent to said work supporting surface generated about said axis and substantially equal to the distance from said axis to said work supporting surface, a movable cutting blade fixed to said member and having a curved cutting edge disposed adjacent and parallel to said curved face and disposed in cooperative shearing relation to said stationary cutting blade, power means for effecting traverse of said rail by said carriage optionally in either direction, and initially tensioned means connecting said curved face with said frame structure effective upon traverse of said rail by said carriage to impart a rolling action to said movable member with resultant shearing of a sheet of material on said work supporting surface and interposed between said blades.

11. A machine for shearing rigid sheet materials such as sheet metal or the like comprising a frame structure having a flat work supporting surface and having a straight, stationary cutting blade with the cutting edge thereof disposed substantially in the plane of said work supporting surface; said frame structure further including a rail spaced from and extending longitudinally parallel to said stationary cutting blade, a carriage mounted on and movable along said rail, a movable cutting blade supporting member mounted on said carriage for oscillatory movement about an axis disposed at right angles to the path of travel of said carriage along said rail, and said member further having a curved face disposed adjacent to said work supporting surface generated about said axis and substantially equal to the distance from said axis to said work supporting surface, a movable cutting blade fixed to said member and having a curved cutting edge disposed adjacent and parallel to said curved face and disposed in cooperative shearing relation to said stationary cutting blade, means for adjusting said axis toward and from said work supporting surface with resultant positioning of said movable cutting blade toward and from said stationary cutting blade, power means for effecting traverse of said rail by said carriage optionally in either direction, and initially tensioned means connecting said curved face with said frame structure effective upon traverse of said rail by said carriage to impart a rolling action to said movable member with resultant shearing of a sheet of material on said work supporting surface and interposed between said blades.

12. A machine for shearing rigid sheet materials such as sheet metal or the like comprising a frame structure having a flat work supporting surface and having a straight, stationary cutting blade with the cutting edge thereof disposed substantially in the plane of said work supporting surface; said frame structure further including a rail spaced from and extending longitudinally parallel to said stationary cutting blade and having a bearing face on the lower side thereof, a carriage mounted on and movable along said rail and having an upper bearing face disposed below and parallel to said bearing face on said rail, roller bearing means interposed between and contacting said bearing faces on said carriage and said rail, a movable cutting blade supporting member mounted on said carriage for oscillatory movement about an axis disposed at right angles to the path of travel of said carriage along said rail and said member further having a curved face disposed adjacent to said work supporting surface generated about said axis and substantially equal to the distance from said axis to said work supporting surface, a movable cutting blade fixed to said member and having a curved cutting edge disposed adjacent and parallel to said curved face and disposed in cooperative shearing relation to said stationary cutting blade, power means for effecting traverse of said rail by said carriage optionally in either direction, and means connecting said curved face with said frame structure effective upon traverse of said rail by said carriage to impart a rolling action to said movable member with resultant shearing of a sheet of material on said work supporting surface and interposed between said blades.

13. A machine for shearing rigid sheet materials such as sheet metal or the like comprising a frame structure having a flat work supporting surface and having a straight, stationary cutting blade with the cutting edge thereof disposed substantially in the plane of said work supporting surface; said frame structure further including a rail spaced from and extending longitudinally parallel to said stationary cutting blade, a carriage mounted on and movable along said rail, a movable cutting blade supporting member mounted on said carriage for oscillatory movement about an axis disposed at right angles to the path of travel of said carriage along said rail and said member further having a curved face disposed adjacent to said work supporting surface generated about said axis and substantially equal to the distance from said axis to said work supporting surface, a movable cutting blade fixed to said member and having a curved cutting edge disposed adjacent and parallel to said curved face and disposed in cooperative shearing relation to said stationary cutting blade, power means comprising a double action fluid pressure cylinder and piston assembly including a cylinder mounted on said frame structure and having a reciprocable piston provided with a piston rod connected to said carriage, an abutment means disposed at the side of the cutting edge of said stationary cutting blade opposite said movable blade operable to intercept and straighten the cut off edge of material at it is being cut, and means for directing fluid under pressure selectively to either end of said cylinder with resultant movement of said carriage by said piston along said rail in a desired direction, and flexible means resiliently connecting said curved face with said frame structure effective upon traverse of said rail by said carriage to impart a rolling action to said movable member with resultant shearing of a sheet of material on said work supporting surface and interposed between said blades.

14. A machine for shearing rigid sheet materials such as sheet metal or the like comprising a frame structure having a flat work supporting surface and having a straight, stationary cutting blade with the cutting edge thereof disposed substantially in the plane of said work supporting surface; said frame structure further including a rail spaced from and extending longitudinally parallel to said stationary cutting blade, a carriage mounted on and movable along said rail, a movable cutting blade supporting member mounted on said carriage for oscillatory movement about an axis disposed at right angles to the path of travel of said carriage along said rail and said member further having a curved face disposed adjacent to said work supporting surface generated about said axis and substantially equal to the distance from said axis to said work supporting surface, a movable cutting blade fixed to said member and having a curved cutting edge disposed adjacent and parallel to said curved face and disposed in cooperative shearing relation to said stationary cutting blade, power means for effecting traverse of said rail by said carriage optionally in either direction, an abutment means disposed at the side of the cutting edge of said stationary cutting blade opposite said movable blade operable to intercept and straighten the cut off edge of material as it is being cut, and flexible means resiliently connecting said curved face with said frame structure effective upon traverse of said rail by said carriage to impart a rolling action to said movable member with resultant shearing of a sheet of material on said work supporting surface and interposed between said blades; said power means comprising a reversible motor having a rotary driving member and devices actuated thereby reacting between said frame structure and said carriage effective to cause said carriage to traverse said rail in a desired direction.

15. A machine for shearing rigid sheet materials such as sheet metal or the like comprising a frame structure having a flat work supporting surface and having a straight, stationary cutting blade with the cutting edge thereof disposed substantially in the plane of said work supporting surface; said frame structure further including a rail spaced from and extending longitudinally parallel to said stationary cutting blade, a carriage mounted on and movable along said rail, a movable cutting blade supporting member mounted on said carriage for oscillatory movement about an axis disposed at right angles to the path of travel of said carriage along said rail and said member further having a curved face disposed adjacent to said work supporting surface generated about said axis and substantially equal to the distance from said axis to said work supporting surface, a movable cutting blade fixed to said member and having a curved cutting edge disposed adjacent and parallel to said curved face and disposed in cooperative shearing relation to said stationary cutting blade, power means for effecting traverse of said rail by said carriage optionally in either direction, and means connecting said curved face with said frame structure effective upon traverse of said rail by said carriage to impart a rolling action to said movable member with resultant shearing of a sheet of material on said work supporting surface and interposed between said blades; said last named means comprising a pair of oppositely disposed, tensioned, flexible members each having one end thereof attached to said frame structure and thence extending in lines parallel to said rail to a point of tangency with said curved lower face of said movable member and thence along said face to a point of attachment of the other end to said movable cutting blade member at the side thereof opposite the point of attachment to said frame srtucture; said flexible members in response to movement of said carriage along said rail being respectively wound onto and unwound from said curved lower face.

16. A machine for shearing sheet metal and comparable rigid material including a frame structure comprising spaced, parallel side members, a work supporting member having a horizontal work supporting surface extending between said side members, a stationary cutting blade carried by said work supporting member and having a cutting blade disposed substantially in the plane of said work supporting surface, a horizontal rail extending between said side members above said stationary cutting blade, a carriage movable along said rail, a pivot carried by said carriage and disposed at right angles to the length of said cutting blade, a movable cutting blade supporting member mounted for oscillation on said pivot and having a curved lower surface generated about the axis of said pivot at a radius substantially corresponding to the distance from said axis to said work supporting surface, a movable cutting blade carried by said member disposed with the cutting edge thereof in a vertical plane containing the cutting edge of said stationary blade and curved substantially to the radius of said lower surface of said member; initially tensioned means extending between said movable blade supporting member and said frame structure effective upon movement of said carriage along said rail to impart movement of said member about said pivot with resultant approximation of a rolling action of said movable blade along said stationary blade and the shearing of a sheet of material on said work supporting surface and extending between said blades, and reversible power means operable to cause said carriage to traverse said rail in either direction.

17. A machine for shearing sheet metal and comparable rigid material including a frame structure comprising spaced, parallel side members, a work supporting member having a horizontal work supporting surface extending between said side members, a stationary cutting blade carried by said work supporting member and having a cutting blade disposed substantially in the plane of said work supporting surface, a horizontal rail extending between said side members above said stationary cutting blade, a carriage movable along said rail, a pivot carried by said carriage and disposed at right angles to the length of said cutting blade, a movable cutting blade supporting member mounted for oscillation on said pivot and having a curved lower surface generated about the axis of said pivot at a radius substantially corresponding to the distance from said axis to said work supporting surface, a movable cutting blade carried by said member disposed with the cutting edge thereof in a vertical plane containing the cutting edge of said stationary blade and curved substantially to the radius of said lower surface of said member, means for adjusting the vertical position of said movable blade relative to said stationary blade, initially tensioned means extending between said movable blade supporting member and said frame structure effective upon movement of said carriage along said rail to impart movement of said member about said pivot with resultant approximation of a rolling action of said movable blade along said stationary blade and the shearing of a sheet of material on said work supporting surface and extending between said blades, and reversible power means operable to cause said carriage to traverse said rail in either direction.

18. A machine for shearing sheet metal and comparable rigid material including a frame structure comprising spaced, parallel side members, a work supporting member having a horizontal work supporting surface extending between said side members, a stationary cutting blade carried by said work supporting member and having a cutting blade disposed substantially in the plane of said work supporting surface, a horizontal rail extending between said side members above said stationary cutting blade, a carriage movable along said rail, a pivot carried by said carriage and disposed at right angles to the length of said cutting blade, roller bearing means interposed between and contacting said face on said rail and said upper face on said carriage, a movable cutting blade supporting member mounted for oscillation on said pivot and having a curved lower surface generated about the axis of said pivot at a radius substantially corresponding to the distance from said axis to said work supporting surface, a movable cutting blade carried by said member disposed with the cutting edge thereof in a vertical plane containing the cutting edge of said stationary blade and curved substantially to the radius of said lower surface of said member, means extending between said movable blade supporting member and said frame structure effective upon movement of said carriage along said rail to impart movement of said member about said pivot with resultant approximation of a rolling action of said movable blade along said stationary blade and the shearing of a sheet of material on said work supporting surface and extending between said blades, and reversible power means operable to cause said carriage to traverse said rail in either direction.

19. A machine for shearing sheet metal and comparable rigid material including a frame structure comprising spaced, parellel side members, a work supporting member having a horizontal work supporting surface extending between said side members, a stationary cutting blade carried by said work supporting member and having a cutting blade disposed substantially in the plane of said work supporting surface, a work straightening ledge disposed adjacent to and below the edge of said stationary cutting blade a horizontal rail extending between said side members above said stationary cutting blade, a carriage movable along said rail, a pivot carried by said carriage and disposed at right angles to the length of said cutting blade, a movable cutting blade supporting member mounted for oscillation on said pivot and having a curved lower surface generated about the axis of said pivot at a radius substantially corresponding to the distance from said axis to said work supporting surface, a movable cutting blade carried by said member disposed with the cutting edge thereof in a vertical plane containing the cutting edge of said stationary blade and curved substantially to the radius of said lower surface of said member, connecting devices extending between said movable blade supporting member and said frame structure effective upon movement of said carriage along said rail to impart movement of said member about said pivot with resultant approximation of a rolling action of said movable blade along said stationary blade and the shearing of a sheet of material on said work supporting surface and extending between said blades devices including resilient means effective to absorb the shock of initial contact of said movable blade with a workpiece, and reversible power means operable to cause said carriage to traverse said rail in either direction; said power means comprising fluid pressure responsive devices operatively connected to said carriage.

20. A machine for shearing sheet metal and comparable rigid material including a frame structure comprising spaced, parallel side members, a work supporting member having a horizontal work supporting surface extending between said side members, a stationary cutting blade carried by said work supporting member and having a cutting blade disposed substantially in the plane of said work supporting surface, a work straightening ledge disposed adjacent to and below the edge of said stationary cutting blade a horizontal rail extending between said side members above said stationary cutting blade, a carriage movable along said rail, a pivot carried by said carriage and disposed at right angles to the length of said cutting blade, a movable cutting blade supporting member mounted for oscillation on said pivot and having a curved lower surface generated about the axis of said pivot at a radius substantially corresponding to the distance from said axis to said work supporting surface, a movable cutting blade carried by said member disposed with the cutting edge thereof in a vertical plane containing the cutting edge of said stationary blade and curved substantially to the radius of said lower surface of said member, means connecting devices extending between said movable blade supporting member and said frame structure effective upon movement of said carriage along said rail to impart movement of said member about said pivot with resultant approximation of a rolling action of said movable blade along said stationary blade and the shearing of a sheet of material on said work supporting surface, and extending between said blades, devices including resilient means effective to absorb the shock of initial contact of said movable blade with a workpiece, and reversible power means operable to cause said carriage to traverse said rail in either direction; said power means comprising a reversible electric motor and devices actuated thereby and reacting between said frame structure and said carriage.

References Cited in the file of this patent

UNITED STATES PATENTS

| | | |
|---|---|---|
| 40,034 | Hardy | Sept. 22, 1863 |
| 364,774 | Schmalz | July 14, 1887 |
| 846,259 | Swan et al. | Mar. 5, 1907 |
| 1,866,799 | Clark | July 12, 1932 |
| 2,272,215 | Lockett et al. | Feb. 10, 1942 |
| 2,521,862 | McCarthy | Sept. 12, 1950 |
| 2,572,757 | Powell et al. | Oct. 23, 1951 |
| 2,733,766 | Wikle | Feb. 7, 1956 |
| 2,776,610 | Roselius | Jan. 8, 1957 |
| 2,777,521 | Tanis | Jan. 15, 1957 |